United States Patent [19]

Kim

[11] Patent Number: 5,408,611

[45] Date of Patent: Apr. 18, 1995

[54] AUTO-SWITCHING DEVICE FOR CPU LOGIC CIRCUITS

[75] Inventor: Donguk Kim, Seoul, Rep. of Korea

[73] Assignee: Samsung Electronics Co., Ltd., Kyunggi, Rep. of Korea

[21] Appl. No.: 885,778

[22] Filed: May 20, 1992

[30] Foreign Application Priority Data

Feb. 12, 1992 [KR] Rep. of Korea .................. 92-2034

[51] Int. Cl.⁶ ............................................. G06F 13/00
[52] U.S. Cl. ...................... 395/275; 395/500; 364/238.2; 364/230; 364/230.6; 364/231
[58] Field of Search ............... 395/275, 325, 500, 700

[56] References Cited

U.S. PATENT DOCUMENTS 4,967,346 10/1990 Freidin ................................ 395/500
5,163,145 11/1992 Parks ................................... 395/500

FOREIGN PATENT DOCUMENTS 0351961 1/1990 European Pat. Off. .

*Primary Examiner*—Robert L. Richardson
*Attorney, Agent, or Firm*—Watson, Cole Grindle & Watson

[57] ABSTRACT

An auto-switching device for CPU logic which automatically senses the kind of CPU, and sets the timing margin according to the sensed kind of CPU, and at the same time switches the CPU logic so that a system can be operated in accordance with the sensed kind of CPU in an IBM PC-compatible system using CPUs of the i80486SX, i80487SX and i80486DX type produced, for example by Intel Co. The auto-switching device is constituted by a CPU socket capable of mounting CPU chips of the i486DX, i486SX chip and the like types and being mounted for multiple use. A ROM having built-in software for detecting the kind of CPU at the time of initial operation and a decoder providing the address of a storage medium for storing information about the kind of CPU detected by the software. A latch stores information about the kind of CPU detected by the software according to the output signal and a PAL (Programmable Array Logic) switches the CPU signal defined by one another at the different position of the CPU socket according to the kind of CPU for operating the system.

3 Claims, 1 Drawing Sheet

AUTO-SWITCHING DEVICE FOR CPU LOGIC CIRCUITS

FIELD OF THE INVENTION

The present invention relates to an auto-switching device for a CPULC (central processing unit logic circuit), and more particularly to an auto-switching device for such a CPULC which automatically senses the kind of CPU, and switches the CPULC so that the system can be operated in accordance with the kind of sensed CPU in IBM Personal Computer (PC) compatible systems using CPUs of the i80486SX, i80487SX and i80486DX types.

RELATED ART

A method for producing a PC module is currently used in enterprises which design, produce and sell IBM PC-compatible systems to cope with a FMS (flexible manufacturing system) for the efficiency of the production process and for multi-kinds of small quantity production.

These producing methods can be classified into a module design method which produces each function with a card by dividing the whole function of the PC into several detailed functions; and a chip-up design method which can change the functions of the CPU by switching only the chip of the CPU.

ROM BIOS(read only memory basic input output system) as well as the CPU are built-in the card of the module design method. However, the module design method has the disadvantage that a user has to completely switch the card of the CPU, because the user has to change into ROM BIOS capable of using the kind of CPU that the user wants to change. This disadvantage results in a cost increase according to the switching of the CPU, because the user has to switch all of the annexed circuit elements related to the CPU, despite the user wanting to switch only the CPU chip.

The chip-up design method changes the kind of PC CPU by only switching the CPU chip to solve the aforementioned problem.

The operation of CPU logic according to a prior art chip-up design method is as follows with reference to the accompanying drawings. FIG. 1 shows the constitution of a CPU logic circuit by the prior art chip-up design method and wherein an i487SX 1 with a FLUSH# terminal thereof connected to a FLUSH# signal line; an AND gate G1 with each terminal thereof connected to a MP# (math present) signal line of the i487SX chip 1, and a FLUSH# signal line, respectively; and an i486SX chip 2 with a FLUSH# terminal thereof connected to the output terminal of the AND gate G1.

The operation of the CPU logic according to the prior art chip-up design method according to the above-mentioned construction is as follows.

In the case where the i486SX 2 is mounted instead of the i487SX chip 1, the MP# signal of the i487SX chip 1 becomes high. If a high level FLUSH# signal is input to the AND gate G1 at this state, the output signal of the AND gate G1 becomes high. But, if a low FLUSH# signal is input to the AND gate G1, the output signal of the AND gate G1 becomes low. In the case where the output of the AND gate G1 becomes high, the high signal is input to the FLUSH# terminal, and so the i486SX chip 2 operates normally. However, in the case where the output of the AND gate G2 is low, the low signal is input to the FLUSH# terminal of the i486SX chip 2, and so the i486SX chip 2 does not operate.

Therefore, the operation is determined by the FLUSH# signal of the i486SX chip 2 in the place of the i487SX chip 1 where the i487SX chip is not mounted.

In the case where the user mounts the i486SX chip 1 to use the i487SX chip 1 as the CPU, the MP# signal of the i487SX chip 1 becomes low. Accordingly, the i486SX chip 2 does not operate, because the output of the AND gate G1 becomes low and the low signal is input to the FLUSH# terminal of the i486SX chip 2. In the case where the high chip FLUSH# signal is input, the i487SX chip 1 continues to operate, but in the case that the low FLUSH# signal is input, the i487SX chip 1 does not operate.

The double use of a i487SX chip 1 and a i486SX chip 2 is possible in the above prior chip-up design method, but the above prior art chip-up design method has the disadvantage of being incapable of sensing a i486DX chip.

A 486 system being capable of multiple use was developed to solve the above-mentioned problem. The technology relating to a method which senses the kind of CPU in a software-like way in such a 486 system and automatically sets the timing margin in a software-like way, was disclosed in laid-open Korean Patent Application No. 92-662 entitled: "A METHOD FOR SENSING THE KIND OF CPU AND AN INDICATING DEVICE THEREOF".

The above-mentioned Korean patent application provides a series of software-like managing operations, including a sensing of the kind of the mounted CPU using a software-like technique and setting the timing margin according to the sensed kind of CPU. However, it has the disadvantage of not specifying the hardware for practically connecting the CPU and the system.

SUMMARY OF THE INVENTION

Accordingly, a primary object of the present invention is to provide an auto-switching device for CPU logic which automatically senses the kind of CPU, and sets the timing margin according to the sensed kind of CPU, and at the same time switches the CPU logic so that the system can be operated in accordance with the sensed kind of CPU in IBM PC-compatible systems using the i80486SX, i80487SX and i80486DX chip types produced by Intel Co. to solve the disadvantages of the above-mentioned prior art.

To accomplish the above-mentioned object, the present invention is constituted by a CPU socket capable of mounting CPU chips of i486DX, i486SX chip and the like kind and being mounted for multiple use; a ROM connected to the address bus and the data bus of the CPU socket, and having software for detecting the kind of CPU at the time of initial built-in operation; a decoder connected to the address bus of the CPU socket and the signal line of an in-out put writing, providing the address of a storage medium for storing information about the kind of CPU detected by the software; a latch connected to the low data signal line of the CPU socket and the output terminal of the decoder, and storing the information about the kind of CPU detected by the software according to the output signal; and a PAL (Programmable Array Logic) connected to the CPU socket and the output terminal of the latch, and switching the CPU signal defining one another at a different position of the CPU socket according to the kind of CPU, so that the system can be operated.

BRIEF DESCRIPTION OF THE DRAWINGS

The above objects, features and advantages of the present invention are believed to be readily apparent from the following description of a preferred embodiment of the best mode of carrying out the invention when taken in conjunction with the drawings, wherein.

DETAILED DESCRIPTION OF THE PREFERRED EMBODIMENT

Figure 1:
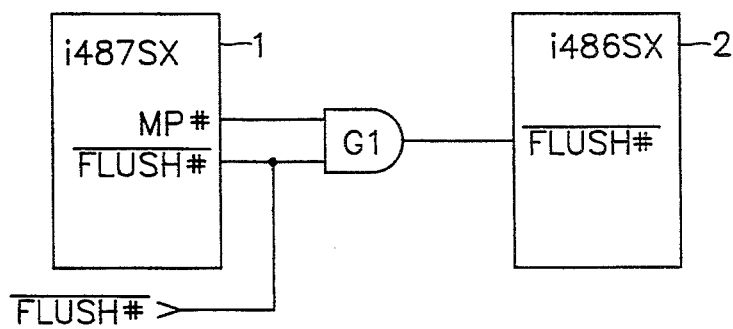
FIG. 1 shows the constitution of the CPU logic according to the prior art chip-up design method.
Figure 2:
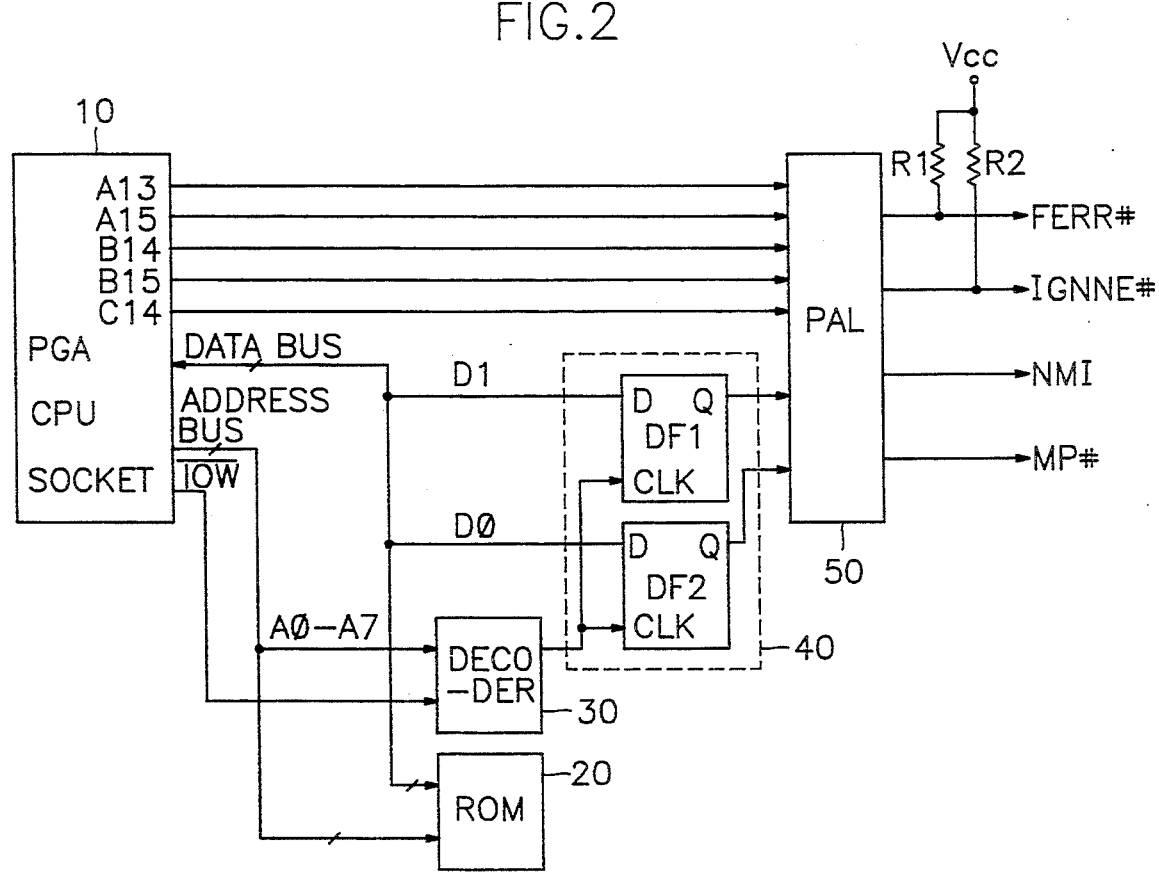
FIG. 2 is a detailed circuit diagram of an auto-switching device for CPU logic according to the preferred embodiment of the present invention.

As shown in FIG. 2, the auto-switching device for CPU logic according to the preferred embodiment of the present invention is constituted by (1) a PGA (Pin Grid Array) CPU socket 10; (2) a ROM 20 connected to the address bus and the data bus of the PGA CPU socket 10; (3) a decoder 30 with an input terminal thereof connected to the address bus and the in-output writing signal line IOW; (4) a latch 40 with each input terminal thereof connected to the output terminals of the low data signal line D1, D0 of the PGA CPU socket 10 and the decoder 30; and (5) a PAL 50 with each terminal thereof connected to the output terminals A13, A15, B14, B15, C14 of the PGA CPU socket 10 and the latch 40. A PGA type CPU socket used in the present invention; however, the technical scope of the present invention is not intended to be limited to just such a specific type CPU socket.

The latch 40 is constituted by a first D type flip-flop DF1 with the input terminal D thereof connected to the low data signal line D1 of the PGA CPU socket 10, and the clock input terminal CLK thereof is connected to the output terminal Q of the decoder 30. A second D type flip-flop DF2 with the input terminal D connected to the low data signal line D0 of the PGA CPU socket 10, and the clock input terminal CLK thereof connected to the output terminal Q of the decoder 30.

The operation of the auto-switching device for CPU logic according to the embodiment of the present invention using the above-mentioned construction is as follows. If power is supplied with a chip mounted in the PGA CPU socket 10, a ROM BIOS routine stored by the mounted CPU in a ROM 20 is carried out. This ROM BIOS routine detects the kind of CPU.

If the POST (Power On Self Test) routine of the ROM BIOS is carried out, the ROM BIOS detects the kind of CPU. In the case where an i487SX type chip is used, the ROM BIOS can read the MP# pin B14 value of the CPU and determine whether the present CPU is the i487SX type or not, by using the fact that the MP# pin B14 value always becomes low if the power is supplied. Namely, the ROM BIOS determines that the CPU is not of the i487SX type in the case where the read MP# pin B14 is "1" and determines that the CPU is the i487SX type in the case where the read MP# pin B14 value is not "1". In the case where the MP# pin B14 value is not "1" the ROM BIOS sets the timing margin of the i487SX type chip in a software-like way.

Since the present CPU is not the i487SX in the case where the MP# pin B14 value of the CPU is "1", the ROM BIOS reads the value of a co-processor control register within the CPU. Next, the ROM BIOS determines whether or not the read value of the co-processor control register is 37FH. This operation can be performed by the following commands.

fninit : initialization
fstcw label : read the value of the co-processor control register
move ax, label
cmp ax, 37FH: discern the 80486DX At this time, the value of the register is 37FH, the ROM BIOS determines that the present CPU is the i486DX, and sets the timing margin of the i486DX in the software-like way. This takes advantage of the return value through the co-processor control register becoming 37FH, owing to the i486DX being built-in the co-processor. However, if the value of the ax register is not 37FH, the ROM BIOS discerns successively whether or not the value of the ax register is FFFFH in the subsequent step.

In the case of the i486SX, this is to make use of the return value of the co-processor control register becoming FFFFH, owing to it not being built-in as in the case of the i486SX chip. In the case where the value of the ax register is FFFFH, the ROM BIOS determines that the present CPU of is the i486SX chip type and sets the timing margin of the i486SX chip type in a software-like way.

The ROM BIOS automatically senses the kind of the CPU in the initial routine of the ROM BIOS in the manner just described. If the kind of the CPU is sensed, the ROM BIOS transmits that result to the auto-switching device for the CPU logic. This operation can be carried out by the following commands.

out XX, 01 : in case that CPU is i486SX
out XX, 02 : in the case where the CPU is of the i487SX type chip
out XX, 03 : in the case where the CPU is of the i486DX type chip and on the condition that XX is an optional I/O address If an optional I/O address, the XX signal is input to the decoder of the auto-switching device for CPU logic through the low address bus A0–A7 of the PGA CPU socket 10 connected to the CPU, the decoder 30 outputs the high signal from the PGA CPU socket 10 to the latch 40 at the time that the in-output writing signal IOW of a low signal is input.

For example, assuming that the optional address XX is BFH, the logic of the decoder can be expressed as follows.

DECODER
OUTPUT=IOW*A7*A6*A5*A4*A3*A2*A1-*A0

If the high output signal from the decoder 30 to the clock input terminal CLK of the first and the second D type flips-flops DF1, DF2 of the latch 40, the first and second D type flips-flops DF1, DF2 outputs the data signals D1, D0 of the PGA CPU socket 10 input from the rising edge of the signal input to the clock input terminal CLK to the input terminal D, to the output terminal Q. Accordingly, the data signals D1, D0 are input to the PAL 50.

The PAL 50 adequately switches at the A13, A15, B14, B15 and C14 position terminals of the PGA CPU socket 10 according to the information signals D1, D0 about the kind of CPU and input from the latch 40. So, the PAL makes the system interface with the identical output signals of the CPU FERR#, IGNNE#, NMI, MP#, regardless of the kind of CPU, and in spite of the CPU being changed.

This is conceived from the aspect that only four signals are set differently one another, when comparing the pin outputs of the i486DX, i487SX type chip and the i486SX. Namely, the FERR# signal of the CPU is defined at the position terminal of the C14 in the case where the i487DX chip is defined at the position terminal A13 in the case of the i487SX chip, and is not defined in the case of the i486SX chip. Additionally, the IGNNE# signal of the CPU is defined at the position terminal A15 in the case of the i486DX chip, is defined at the position terminal A13 in the case of the i487SX chip, and is not defined in the case of the i486SX chip. Also, the MP# signal of the CPU is defined at the position terminal of the B14 only in the case of the i487SX chip. And the NMI signal of the CPU is defined at the position terminal B15 in the case of the i486DX chip, is defined at the position terminal B15 also in the case of the i487SX chip, and is defined at the position terminal A15 in the case of the i486SX chip. The following table shows the comparison of the CPU signals according to the above explanation.

| CPU SIGNAL | DEFINED POSITION TERMINAL | | |
|---|---|---|---|
| | i486DX | i487SX | i486SX |
| FERR# | C14 | A13 | NC |
| IGNNE# | A15 | A15 | NC |
| MP# | NC | B14 | NC |
| NMI | B15 | B15 | A15 |

Where NC is defined as "no connect".

Accordingly, the PAL 50 receives the signals defined at the different positions one another according to the CPU if the CPU is switched, and always outputs the signals to the same signals through an adequate decoding process. So, the PAL 50 makes the system operate normally despite the switching of the CPU. The logic of the PAL 50 for the above decoding process can be expressed as follows.

| PAL equation | |
|---|---|
| /FERR = | D0 * D1 * C14; in the case of the i486DX chip |
| | D0 * D1 * A13 * MP; in the case of the i487SX chip |
| /IGNNE = | D0 * D1 * A15; in the case of the i486DX chip |
| | D0 * D1 * A15 * B14; in the case of the i487SX chip |
| /NMI = | D0 * D1 * B15; in the case of the i486DX chip |
| | D0 * D1 * A15; in the case of the i486SX chip |
| | D0 * D1 * B15 * B14; in the case of the i487SX chip |
| /MP = | D0 * D1 * B14 |

Accordingly, the PAL 50 can always provide fixed output signals with the system according to the kind of CPU, though the positions of the output signals DERR#, IGNNE#, NMI, MP# from the PGA CPU socket 10 are changed according to the CPU mounted to the PGA CPU socket 10.

As shown in the above description, in the preferred embodiment of the present invention the auto-switching device can be provided for CPU logic which automatically senses the kind of CPU, and sets the timing margin according to the sensed kind of CPU, and at the same time switches the CPU logic so that the system can be operated in accordance with the sensed kind of CPU in an IBM PC-compatible systems using the CPU of the i80486SX, i80487SX and i80486DX type chips produced by Intel Co. This effect of the present invention can be applied to the field of information processing machinery and tools of the IBM PC-compatible systems.

What is claimed is:

1. An auto-switching device for CPU logic, comprising:
   a CPU socket for mounting a plurality of different type CPU chips and including an address bus and a data bus;
   a ROM connected to the address bus and the data bus, and having software for detecting the type of CPU at the time of initial operation of the auto-switching device;
   a decoder connected to the address bus and the signal line of an input/output write (IOW) line for providing the address of a storage medium for storing information identifying the type of CPU detected by the software on an output terminal;
   a latch connected to the low data signal line of the CPU socket and the output terminal of the decoder, and storing said information;
   and a PAL (Programmable Array Logic) circuit connected to the CPU socket and the output terminal of the latch, and switching the CPU signal in accordance with the type of CPU.

2. An auto-switching device for CPU logic as claimed in claim 1, wherein said latch is constituted by a first D type flip-flop with the input terminal thereof connected to the low data signal line of the PGA CPU socket, and the clock input terminal thereof connected to the output terminal of the decoder; and a second type flip-flop with the input terminal connected to the low data signal line of the PGA CPU socket, and the clock input terminal thereof connected to the output terminal of the decoder.

3. An auto-switching device for CPU logic as claimed in claim 1, wherein said CPU socket is constituted by a PGA type socket.

* * * * *